United States Patent
Amin et al.

(10) Patent No.: US 6,521,335 B1
(45) Date of Patent: Feb. 18, 2003

(54) METHOD OF FABRICATING A SUBMICRON NARROW WRITER POLE

(75) Inventors: Nurul Amin, Burnsville, MN (US); James Giusti, Chanhassen, MN (US); Charles Joseph Olson, Minneapolis, MN (US); Paul Allen Jallen, Minneapolis, MN (US)

(73) Assignee: Seagate Technology, Inc., Scotts Valley, CA (US)

( * ) Notice: Subject to any disclaimer, the term of this patent is extended or adjusted under 35 U.S.C. 154(b) by 0 days.

(21) Appl. No.: 09/260,452

(22) Filed: Mar. 2, 1999

Related U.S. Application Data

(60) Provisional application No. 60/084,659, filed on May 7, 1998.

(51) Int. Cl.⁷ .............................. G11B 5/31; G11B 5/127
(52) U.S. Cl. ....................... 428/336; 428/692; 428/693; 360/126
(58) Field of Search ................... 29/603.2, 603.07, 29/603.14, 603.25; 216/11, 22, 51, 39; 360/121, 122, 112, 119, 318, 126, 110, 128, 113; 204/192.34; 428/692, 694 R, 694 TS, 336, 693

(56) References Cited

U.S. PATENT DOCUMENTS

| | | |
|---|---|---|
| 5,126,232 A | 6/1992 | Gau ........................... 430/320 |
| 5,406,434 A | 4/1995 | Amin et al. ................. 360/126 |
| 5,488,528 A * | 1/1996 | Chen et al. .................. 360/126 |
| 5,554,265 A | 9/1996 | Bonyhard et al. ..... 204/192.35 |
| 5,640,754 A | 6/1997 | Lazzari et al. ........... 29/603.14 |
| 5,648,884 A | 7/1997 | Lazzari ....................... 360/113 |
| 5,668,689 A | 9/1997 | Schultz et al. .............. 360/113 |
| 5,764,448 A | 6/1998 | Lazzari ....................... 360/113 |
| 5,804,085 A * | 9/1998 | Wu et al. ...................... 216/22 |
| 5,875,542 A * | 3/1999 | Tran et al. ............... 29/603.14 |
| 5,890,278 A * | 4/1999 | Van Kesteren ........... 29/603.14 |
| 6,054,023 A * | 4/2000 | Chang et al. ............. 204/192.2 |
| 6,055,138 A | 4/2000 | Shi ............................. 360/126 |

* cited by examiner

Primary Examiner—Stevan A. Resan
Assistant Examiner—Kevin M. Bernatz
(74) Attorney, Agent, or Firm—Kinney & Lange, P.A.

(57) ABSTRACT

A writer pole and a method for fabricating a writer pole is disclosed. The method comprises fabricating a conductive seed layer on a gap substrate and then fabricating a nonmagnetic feature on the seed layer where the nonmagnetic feature has a top layer and a plurality of sides. The seed layer and nonmagnetic feature are covered with photoresist. A window is fabricated in the photoresist, exposing a portion of the nonmagnetic feature and a portion of the seed layer, thereby exposing a top portion and a side portion of the nonmagnetic feature and exposing a portion of the seed layer. The portion of the seed layer in the window area is removed from the gap substrate. A pole is fabricated on the top and side portions of the nonmagnetic feature in the window area.

10 Claims, 3 Drawing Sheets

METHOD OF FABRICATING A SUBMICRON NARROW WRITER POLE

CROSS-REFERENCE TO RELATED APPLICATION(S)

This application is based upon and claims priority from U.S. Provisional Application No. 60/084,659 filed May 7, 1998.

BACKGROUND OF THE INVENTION

The present invention relates to the fabrication of a magnetoresistive (MR) head and/or a giant MR head. More specifically, the present invention is a writer pole and a method of fabricating a writer pole for high density recording.

Thin film magnetic read/write heads are used for magnetically reading information from and writing information to a magnetic storage medium such as a magnetic disc or a magnetic tape. During a read operation, an MR reader (including a giant MR reader or a spin tunneling reader), consisting of various magnetic and nonmagnetic layers, is used to read magnetically encoded information from the magnetic medium by detecting magnetic flux stored on the magnetic medium. During a write operation, a writer, consisting of a top pole, a bottom pole, and a gap between the poles, writes information to the storage medium.

Bits of information are written to and stored on the storage medium in the form of a zero (0) or a one (1). During a write operation, the writer writes information to the storage medium by manipulating the polarity of the top and bottom poles to achieve the desired result. The polarity change in the writer head induces a change or transition in the stored magnetic field of the data storage medium.

It is desirable to provide a high density of information on the magnetic storage medium. Recording systems provide areal densities which are as high as possible for a given recording surface, within cost and fabrication limits. In the case of rotating disc drives (both floppy and hard disc), the areal density is found by multiplying the number of bits along a track by the number of tracks available per storage medium. The demand for increased storage density in magnetic storage media has led to reduced magnetic dimensions both in the area necessary to store information and in the apparatus used to read and write the information to the storage medium.

In order to provide the desired information density, the track widths of the storage medium are continually becoming smaller. Thus, it is desirable to fabricate a writer pole having a minimal width. High data storage density, such as 10 Gb/in$^2$ and higher, will require a pole width narrower than 0.5 μm. Currently, prior art writer poles are created by plating a pole material into a feature created by photolithographic techniques. However, the existing photolithographic techniques are limited to creating line widths of certain aspect ratios. The aspect ratio is defined as the depth of a hole divided by the width of a hole. With respect to the current photolithographic techniques for fabricating writer poles, the aspect ratio is the thickness of the photoresist, through which a hole is opened, divided by the width of the feature defined by the photoresist removed during the developing process. Thus, a hole having a depth of 20 μm and a width of 5 μm would have an aspect ratio of 20/5 or 4.

Fabrication of writer poles using prior art photolithographic and plating techniques is of limited utility for submicron poles, defined as having a pole width narrower than 0.5 μm because of several process limitations inherent to photolithography and plating. The first limitation in creating submicron features is process capability limitations inherent to using photolithographic techniques. Applying prior art photolithographic technology to submicron features is limited because the process uses light having a wavelength longer than the width of the photoresist line to be printed. The width of the line printed in the photoresist effectively becomes the width of the writer pole. The smallest wavelength of light currently used in prior art applications is greater than 0.5 μm, and as a result lines narrower than 0.5 μm are difficult to fabricate within the tolerances required by submicron writer poles.

A second limitation to prior art photolithographic techniques are due to the physical limitations in the photolithographic process itself. Fabricating submicron features using a high aspect-ratio photoresist necessarily implicates fabricating a narrow cavity or hole in a thick photoresist. Since the exposure time necessary to process photoresist increases as the thickness of the photoresist increases, a thick photoresist requires a relatively longer process exposure time. As a result of the long exposure time, undesired inclined walls are formed in the developed cavity, where fabricating of a feature with non-inclined walls is desired.

Even if the limitations of the prior art photolithographic techniques were removed, the fabrication of submicron features in such a small opening would still be difficult because of physical limitations of the plating process utilized. Plating in small holes is difficult because of the surface tension of the plating solution fluid. Very small holes do not tend to get wetted by the solution. Wetting is a phenomena whereby a fluid is in intimate physical contact with a solid surface. Areas of the surface not wetted will not be plated because there is no way for ions in the plating solution to be deposited on the surface to be plated.

Even if the holes are somehow wetted, process control is still difficult because the plating solution in the holes is depleted of ions as ions from the plating solution are deposited onto the plated surface. In very small holes, such as those necessary to fabricate submicron features, the ions in the holes are not replenished because the ion replacement rate is limited by diffusion of the ions from the bulk fluid into the hole. The bulk concentration of the plating fluid is the concentration of the ions in the plating solution outside the volume of the holes and the bulk concentration is effectively a constant value because it is continuously mixed. The ion concentration in the hole is not a constant and varies with time since the ion replacement rate is diffusion limited because the plating solution in the holes is not well mixed with the plating solution in the bulk. As a result of the inhibited mixing between the plating solution in the holes and the plating solution in the bulk, the smaller holes are not uniformly plated. Thus, there is an uncontrolled process compared to when larger holes are plated, where the surface tension does not inhibit wetting of the surface and the ion concentration is more nearly constant due to the solution in the hole being replenished by turbulent fluid exchange with the bulk.

It is desirable to have a process of fabrication for submicron writer poles that allows for good process control and economical costs. Such a process would allow fabrication of varying writer track widths simply by changing the plating thickness rather than requiring a mask for each size. Since the plating process would be well characterized in such an application, the variation of pole width would be well controlled. While such a process would be useful in fabrication of submicron writer poles, any application requiring submicron features would benefit from such a process.

BRIEF SUMMARY OF THE INVENTION

The present invention provides a writer pole having submicron features and a method of fabricating submicron features on a magnetoresistive head. In one preferred embodiment, the features created using the process of the current invention are submicron width writer poles. The process begins with a substrate material upon which a conductive seed layer is sputtered or deposited. A nonmagnetic feature is then plated onto the conductive seed layer.

One preferred method of fabricating the nonmagnetic feature would use the commonly employed steps of mask, expose, develop, and etch. First, after the conductive seed layer is placed on the substrate, photoresist would be applied to cover the entire conductive seed layer. The resist is then exposed so that when the photoresist is developed after exposure, a window is opened in the photoresist which exposes the seed layer where the magnetic feature is to be plated. The nonmagnetic feature is then plated on the exposed conductive seed layer in the window opening. After the nonmagnetic feature is plated in the open window, the remaining photoresist is removed.

After the resist is removed, the entire area containing the seed layer and nonmagnetic feature is masked, exposed and developed, whereby the area of the nonmagnetic feature where a pole will eventually be plated is opened and the remaining part of the nonmagnetic feature is covered with photoresist. The conductive seed layer adjacent to the area of the nonmagnetic feature to be plated is etched from the substrate. A writer pole is then plated on the portion of the nonmagnetic feature not covered with photoresist after the exposed photoresist is developed. The plated thickness of the writer pole on the nonmagnetic feature then becomes the width of the pole.

DETAILED DESCRIPTION

The present invention is a writer pole having submicron features and a method of fabrication a writer pole having submicron features. It is understood that the present invention can be used in conjunction with any type of reader, including a magnetoresistive (MR) reader, a giant MR reader or a spin tunneling reader.

Figure 1:
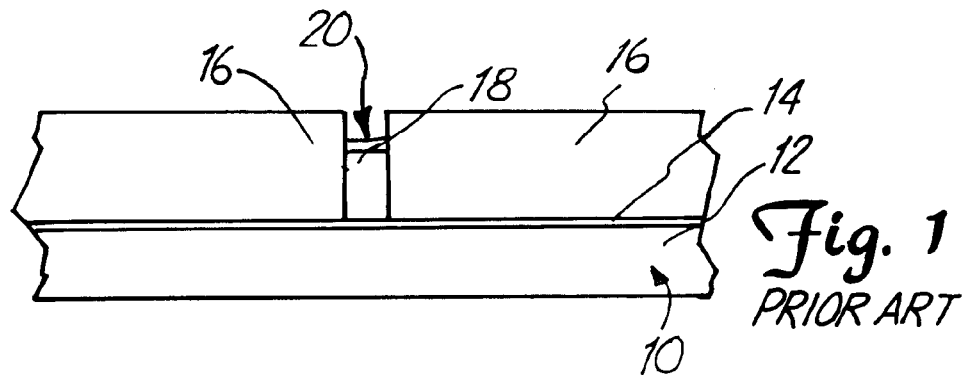
FIG. 1 is a layer diagram showing a writer pole fabricated using prior art methods.

FIG. 1 is a layer diagram illustrating the fabrication of writer 10 using prior art techniques. Writer 10 includes gap substrate 12, conductive seed layer 14, photoresist 16, feature 18, and writer pole piece 20. Writer 10 is created by plating pole piece 20 into feature 18 in photoresist 16. Feature 18 is created by photolithographic techniques. To create feature 18, conductive seed layer 14 is fabricated on gap substrate 12 by sputtering or any other suitable method. Conductive seed layer 14 is then covered with photoresist 16. Feature 18 is created in photoresist 16 by exposing, developing and removing photoresist 16 from the area which will become feature 18. A pole piece 20 is then plated into feature 18 using conventional plating processes.

Using the methods of the prior art, the width of writer pole piece 20 is the same dimension as the width of feature 18 created in photoresist 16. For example, if feature 18 in photoresist 16 is 2.0 $\mu$m, then the width of the plated writer pole piece 20 is 2.0 $\mu$m. The method of the prior art is not suitable for creating submicron width writer poles, i.e. writer poles having a width less than 0.05 $\mu$m.

With increased demands for high density recording, the writer pole width dimension is ever decreasing. Data storage density of 10 gigabytes per square inch and higher will require a pole width narrower than 0.5 $\mu$m. Writer poles created by plating a pole material using the thermographic techniques shown and described in FIG. 1 are incapable of providing the desired width of the pole writer. The above-described photo techniques are limited to creating a line width having an unacceptable aspect ratio. Moreover, plating a metal material into a narrow and high trench to achieve a pole width narrower than 0.5 $\mu$m is not possible.

FIGS. 2–8 are layer diagrams which disclose a method of fabricating a writer head having a writer pole with submicron widths in accordance with the present invention.

Figure 2:
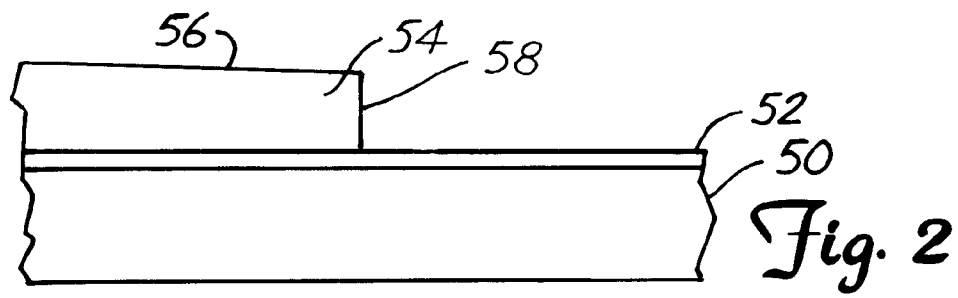
FIGS. 2–8 are layer diagrams showing a writer head incorporating the present invention.

FIG. 2 is a layer diagram illustrating the present invention and includes gap substrate 50, conductive seed layer 52, and nonmagnetic metal layer or feature 54 having top surface 56 and side surface 58. Nonmagnetic feature 54 has been plated onto seed layer 52. The first step in creation of nonmagnetic feature 54 is fabrication of conductive seedlayer 52 upon gap substrate 50. Conductive seed layer 52 is fabricated on gap substrate 50 by sputtering or other method of deposition to a thickness on the order of 1000 Angstroms.

Next, nonmagnetic feature 54 is fabricated on conductive seedlayer 52 through a series of process steps comprising masking, exposing, developing, plating, and stripping. Nonmagnetic feature 54 is fabricated of a nonmagnetic metal such as nickel, copper, or gold or fabricated from a nonmagnetic alloy such as nickel-phosphorous or nickel-palladium and can be plated to any desired thickness.

Figure 3:
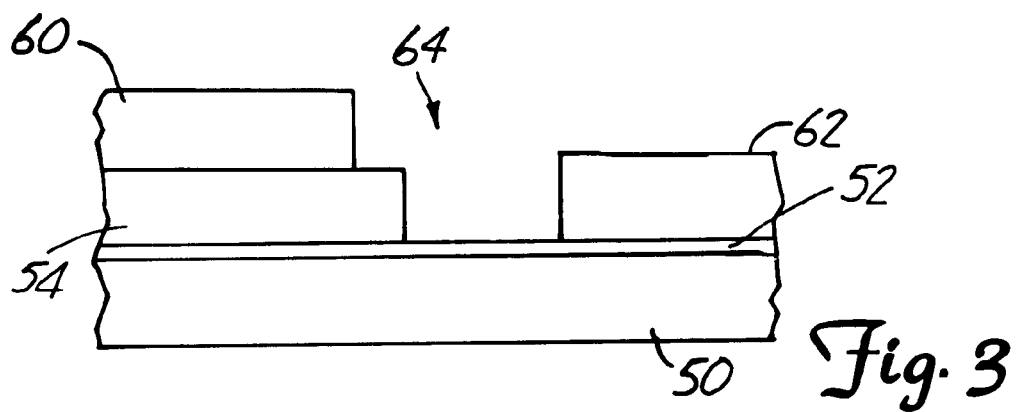

FIG. 3 is a layered diagram illustrating the present invention showing window 64 fabricated as an open area between photoresists 60 and 62. A layer of photoresist is fabricated on top of seed layer 52 and nonmagnetic feature 54. The photoresist is then removed from a portion of nonmagnetic feature 54 on side 58 and top 56 of the area of the nonmagnetic feature 54 desired to be plated. Photoresist 60 is also removed from an area of conductive seed layer 52 adjacent to side 58 of nonmagnetic feature 54 where plating is desired. Photoresist 60 is removed from window area 64, preferably by a process such as photolithography, thereby leaving photoresist 60 and 62. The photolithography process comprises masking, exposing, and developing. After window 64 is fabricated, nonmagnetic feature 54 is ready for plating of a writer pole.

Figure 4:
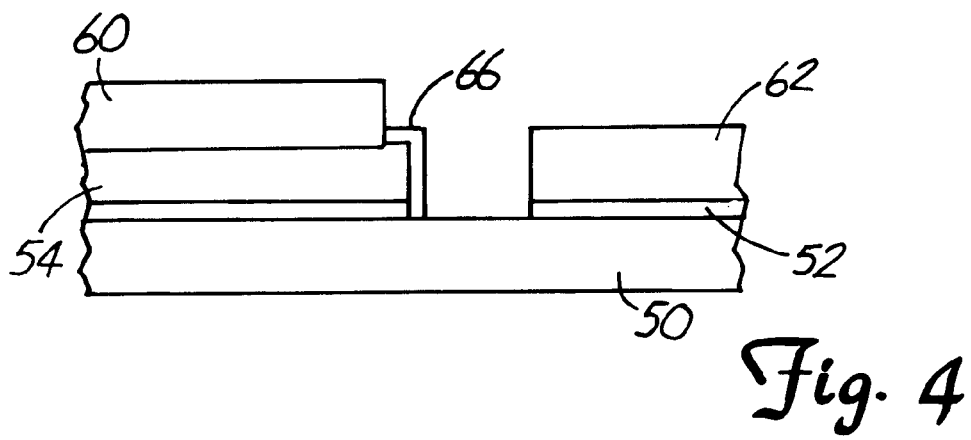

FIG. 4 is a layered diagram illustrating the present invention showing writer pole 66 plated on nonmagnetic feature 54. Writer pole 66 is preferably formed from a magnetic metal. Prior to the plating step, conductive seed layer 52 adjacent to side 58 of nonmagnetic feature 54, is removed from gap substrate 50. Conductive seed layer 52 is removed by etching, which can be either by a wet or a dry process. After conductive seed layer 52 is removed from gap substrate 50, writer pole 66 is plated on top 56 and side 58 of nonmagnetic feature 54 which are not covered by photoresist 60. Writer pole 66, formed from a magnetic metal, attaches to the exposed portions of nonmagnetic feature 54 and conductive seed layer 52.

The width of writer pole 66 is the plated thickness of writer pole 66 on plated side 58 of nonmagnetic feature 54. Since the plating process is well controlled in an open region like window area 64, the width of the developed pole is easily controlled even when the width is in the submicron range i.e. less than 0.5 $\mu$m. Thus, the phenomena of wetting, as previously discussed, is no longer an issue. After writer pole 66 is plated, any remaining photoresist 60 and 62 and any seed layer 52 beneath photoresist 62 is stripped.

Figure 5:
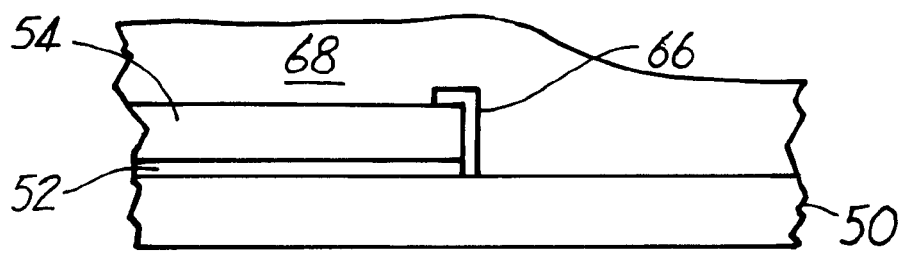

FIG. 5 is a layered diagram illustrating the present invention showing overcoat 68 covering nonmagnetic feature 54, writer pole 66, and gap substrate 50 where conductive seed layer 52 has been removed. Overcoat 68 material is preferably alumina. Overcoat 68 is utilized when plating a second piece pole in addition to writer pole 66 is desired.

Figure 6:
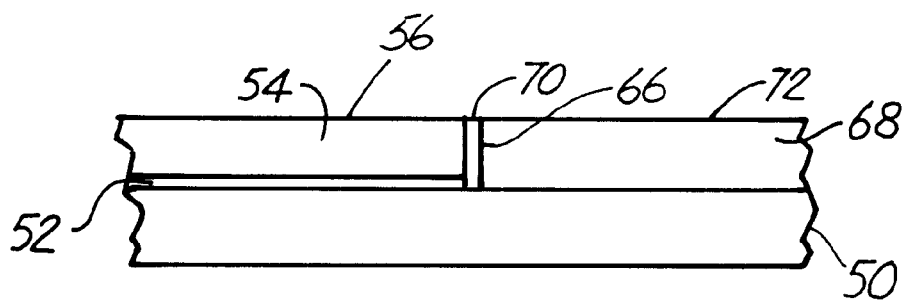

FIG. 6 is a layered diagram illustrating the present invention showing writer pole 66 and overcoat 68 after planarization. Planarization is accomplished through a process, preferably lapping or other type of precision grinding. However, other types of planarization techniques may be utilized. After writer pole 66 and overcoat 68 are planarized, a planar surface is formed comprising top surface 70 of writer pole 66, top surface 72 of overcoat 68 and top surface 56 of nonmagnetic feature 54.

As shown in FIG. 6, writer pole 66 has been fabricated which has a pole width narrower than 0.5 μm. Thus, the width of writer pole 66 is capable of high density recordings in the area of 10 gigabytes per square inch and higher. The width of writer pole 66 is controlled by the plating process as previously described.

At this point, depending upon the desired design, a submicron writer pole has been fabricated. However, in some instances, it is desirous to have a two-piece writer pole application depending upon the type of write application. For those instances in which a two-piece writer pole is desired, the following steps are added to the above-described process.

Figure 7:
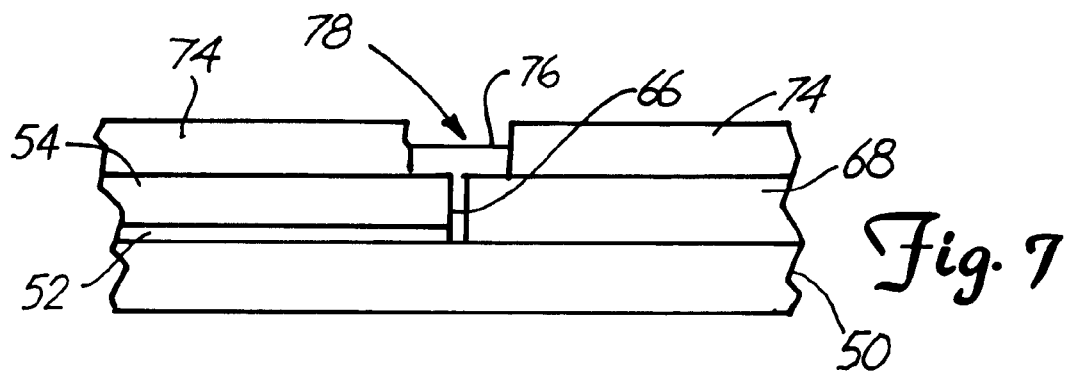

FIG. 7 is a layered diagram illustrating the present invention showing second piece pole 76 which has been plated to form an integral and continuous unit with writer pole 66. Second piece pole 76 is formed by creating a pattern in photoresist 74 which is placed on the planarized surface that was created in the previous process step. The process of forming second piece pole 76 includes the process step of masking, exposing, and developing photoresist 74 in order to form a cavity 78 into which second piece pole 76 is plated. Second piece pole 76 is preferably formed from a magnetic metal and is relatively wide compared to writer pole 66, however, is not faced with the same process limitations that inhibit the plating of submicron writer poles using current photolithography and plating techniques.

Figure 8:
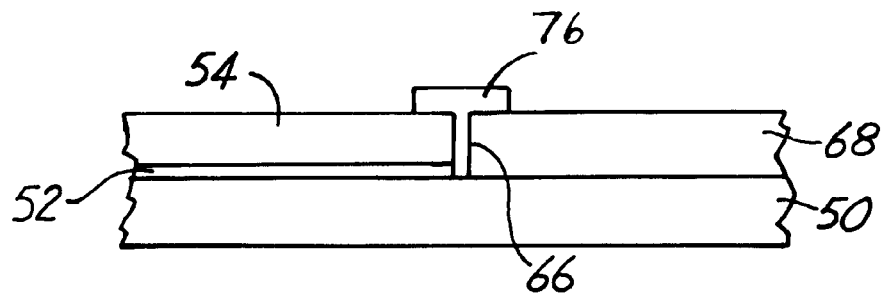
Figure 9:
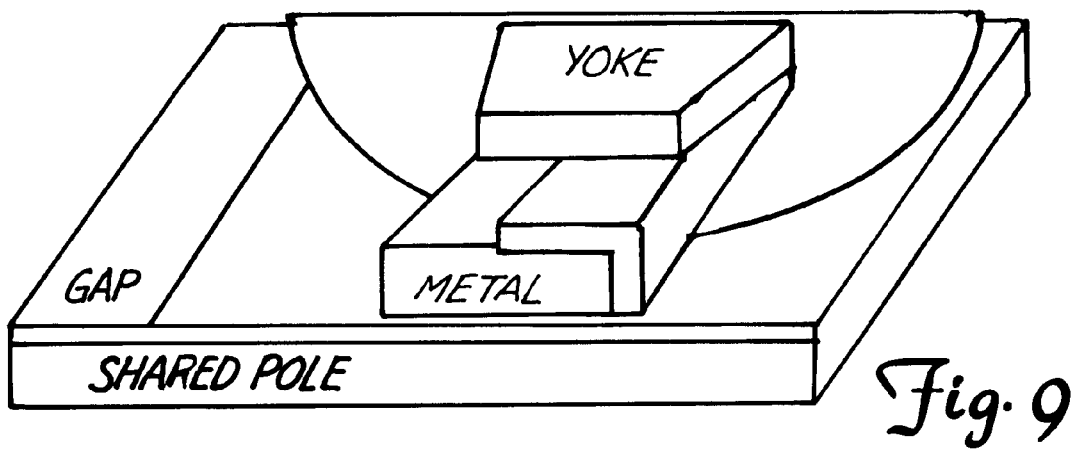
FIG. 9 is a top perspective view of one embodiment of a write head of the present invention.

FIG. 8 is a layered diagram showing completed writer pole 66 with integral second piece pole 76. Photoresist has been stripped from top surface 56 of nonmagnetic feature 54 and from top surface 72 of overcoat 68. The writer head is now ready for any further processing that may be necessary to complete the entire assembly.

With the above-described fabrication process, it is possible to fabricate writer poles having a width in submicron range. In addition, various products requiring different writer track width will not need different masks. Any desired track width can be achieved by simply changing the plating thickness within a single mass. In addition, the writer pole width control is better than that of prior art methods since the plating thickness can be easily controlled.

Although the present invention has been described with reference to preferred embodiments, workers skilled in the art will recognize that changes may be made in form and detail without departing from the spirit and scope of the invention.

What is claimed is:

1. A writer comprising:
   a top writer pole;
   a bottom writer pole;
   a gap substrate layer between the top pole and the bottom pole; and
   a metallic nonmagnetic layer for providing a plating surface substantially normal to a plane of the gap substrate layer;
   wherein at least a portion of the top writer pole is fabricated on the plating surface, the portion having a width less than 0.5 μm.

2. The writer of claim 1 further comprising:
   a seed layer positioned on a first portion of the gap substrate layer, wherein the nonmagnetic layer is positioned on the seed layer.

3. The writer of claim 2 further comprising:
   an overcoat positioned on a second portion of the gap substrate layer adjacent the portion of the top writer pole fabricated on the plating surface, the overcoat positioned opposite the nonmagnetic layer.

4. The writer of claim 3 wherein the top writer pole comprises:
   a first top writer pole piece fabricated on the plating surface; and
   a second top writer pole piece positioned on the first top writer pole piece, on a portion of the nonmagnetic layer and on a portion of the overcoat.

5. A writer comprising:
   a gap substrate layer having a first portion, a second portion and a third portion, the second portion of the gap substrate layer being positioned between the first and third portions;
   a seed layer fabricated on the first portion of the gap substrate layer;
   a metallic nonmagnetic layer fabricated on the seed layer; and
   a first top writer pole piece fabricated on the second portion of the gap substrate layer, the first top writer pole piece being plated to a submicron width onto a side of the seed layer and onto a side of the nonmagnetic layer.

6. The writer of claim 5 and further comprising:
   an overcoat fabricated on the third portion of the gap substrate layer adjacent the first top writer pole piece.

7. The writer of claim 6 and further comprising:
   a second top writer pole piece fabricated on the first top writer pole piece, on a portion of the nonmagnetic layer and on a portion of the overcoat.

8. A writer comprising:
   an electrically insulating gap substrate layer;
   a seed layer positioned upon a first portion of the gap substrate layer;
   a nonmagnetic metallic layer positioned upon the seed layer, wherein a side of the seed layer and a side of the nonmagnetic metallic layer form a plating surface substantially normal to the gap substrate layer; and
   a first top writer pole piece plated onto the plating surface of the seed layer and the nonmagnetic layer, wherein the first top writer pole piece has a width less than 0.5 μm.

9. The writer of claim 8 and further comprising:
   an overcoat positioned upon a second portion of the gap substrate layer adjacent the first top writer pole piece opposite the seed layer and the nonmagnetic metallic layer.

10. The writer of claim 9 and further comprising:
   a second top writer pole piece positioned upon the first top writer pole piece, upon a portion of the nonmagnetic layer and upon the portion of the overcoat.

* * * * *